July 15, 1941.　　　J. SIXT ET AL　　　2,249,543
PROCESS OF PRODUCING KETENE
Filed Nov. 27, 1937
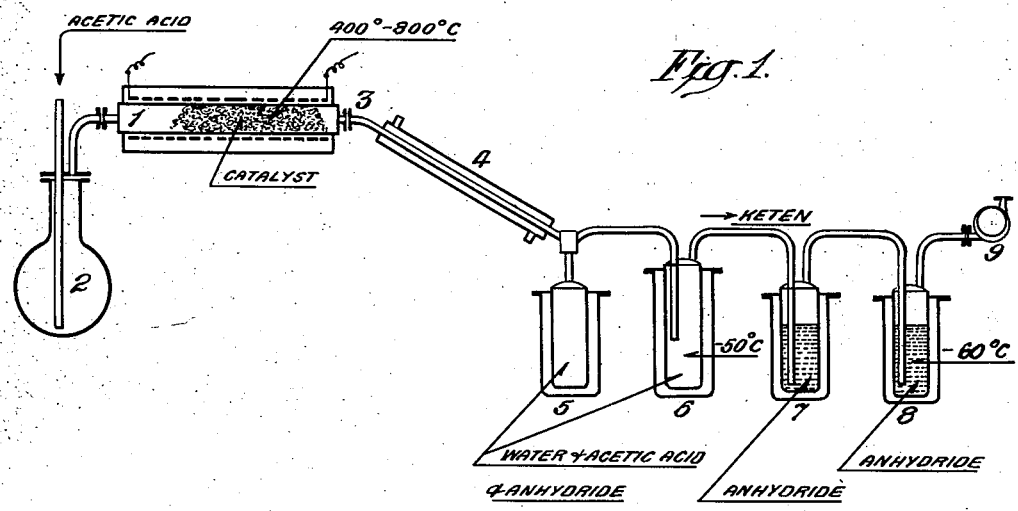
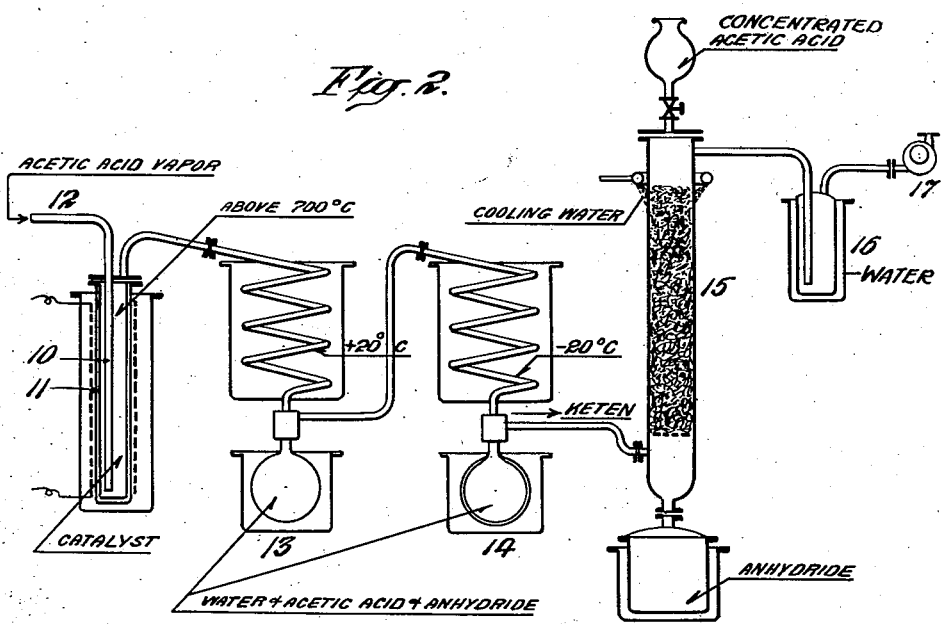
INVENTORS
JOHANN SIXT
MARTIN MUGDAN
BY
Sager & Malcolm
ATTORNEYS Patented July 15, 1941

2,249,543

UNITED STATES PATENT OFFICE 2,249,543

PROCESS OF PRODUCING KETENE

Johann Sixt and Martin Mugdan, Munich, Germany, assignors, by mesne assignments, to Tennessee Eastman Corporation, Kingsport, Tenn.

Application November 27, 1937, Serial No. 176,808
In Germany September 16, 1933

10 Claims.  (Cl. 260—550)

This invention relates to a process of producing ketene from acetic acid and is a continuation-in-part of our copending application Serial No. 742,888, filed September 6, 1934, now Patent No. 2,108,829.

In the processes disclosed in Meingast and Mugdan Patents No. 1,570,514 of Jan. 19, 1926, No. 1,636,701 of July 26, 1927, and No. 1,946,707 of Feb. 13, 1934, and other patents, acetic anhydride is obtained by heating acetic acid vapor to temperatures of 400–800° C. in the presence of catalysts. The reaction takes place according to the equation:

$$2CH_3COOH = (CH_3CO)_2O + H_2O$$

It has been assumed that the primary product of this splitting up is not anhydride, but ketene, which is generated according to the equation:

$$CH_3COOH = CH_2CO + H_2O$$

and only then forms anhydride with acetic acid beyond the heating zone, according to the following formula:

$$CH_2CO + CH_3COOH = (CH_3CO)_2O$$

We have found that the ketene primarily formed according to this assumption can be prevented to a great, in fact to a predominant degree, from combining with acetic acid and water to form anhydride or acetic acid, and can be isolated, by carrying out the process of splitting up the acetic acid under less than atmospheric pressure, at between 400–900° C. and subjecting the vaporous product of the splitting, which is under vacuum, to condensation by cooling under such conditions as to allow the ketene insufficient time to combine with the acetic acid or the water. This can be done, for example, by preventing the condensation from taking place in spaces which are too large, or by passing the split vapors through a cooled liquid such as water which dissolves the ketene not at all or only to a small extent, or by using from the very beginning dilute acetic acid for the ketene formation. The ketene gas thus separated under low pressure from the acetic anhydride, acetic acid and water is then isolated by cooling to a low temperature or by absorption, or it is obtained on the pressure side of the vacuum pump. The ketene gas can also be transformed into anhydride or other compounds by permitting it to react upon water free acetic acid. The temperatures involved in the cooling referred to above generally are below 100° C. As apparent from the legend on the drawing, and as will be further apparent from the temperatures set forth in the examples which follow, such as Examples I, V, and VI, the temperature may be, for example a +20° C. for the separation of gaseous ketene, or the temperature may be a −100° C. when ketene is condensed without solvent, as described in Example V.

It has already been proposed to effect the splitting up of acetic acid under reduced pressure but ketene has never been obtained by that method. It would seem that the split vapors have always been condensed in apparatus of very large surface or under such other conditions as to allow the ketene to recombine with the excess acetic acid and thereby disappear. It was never thought possible to obtain ketene as a final product, hence no measures have ever been taken with a view to its isolation or further elaboration. The application of such measures, herein described, is essential for the present process. A Liebig or coil cooler was used in the following examples for the cooling of the first main part of the dissociation product, said cooler having a cooling chamber of less than 0.1 liter capacity at an average of 600 g. of acetic acid per hour. If, instead of this cooler, a cooler of about one liter capacity were used, the greater part of the ketene would be lost by recombining with the acetic acid and the water in the cooler. We have also found that the partial recombination of the ketene with water to form acetic acid in the spaces behind the splitting zone may be still further reduced by adding to the vapors small quantities of nitrogen-containing bases such as ammonia, pyridine, dimethylamine or trimethylamine.

The invention is illustrated by the following examples taken in connection with the accompanying drawing in which Figs. 1 and 2 are diagrammatic views showing different arrangements of apparatus for carrying out the process.

Example I

In this embodiment of the invention, which is illustrated in Fig. 1, we employed an electrically heated copper tube 1 measuring 25 mm. in diameter and 1000 mm. in length, filled with pea size "Carborundum" pieces coated with sodium metaphosphate. One end of the tube was connected to an acetic acid evaporator 2 while the other end was connected to a narrow tube 3 adapted to carry off the dissociation products. The tube emptied into a Liebig cooler 4 to which a cooled receiver or condenser 5 was joined. This was followed by a second condenser 6 cooled by means of cooling brine of minus 50° C. From condenser 6 the gases were passed into two vessels 7 and 8 filled with acetic acid, the vessel 8 being cooled to minus 60° C. and containing an addition of acetone in order to prevent freezing up. These two latter vessels served to determine the ketene by transformation into anhydride. A vacuum pump 9 located at the end of the apparatus maintained the system under an absolute pressure of about 15 mm. In one hour 105 grams of acetic acid vapor were supplied to the tube I at a contact temperature of 650° C. (measured at the end of the contact layer). Of the total anhydride formed, namely 18.5 grams, 75% was found in receivers 5 and 6 and 25% was found in the two acetic acid receivers 7 and 8, as anhydride. This latter portion corresponds to the free ketene. The acetyl losses by decomposition were negligible.

Example II 105 grams of acetic acid vapor, containing 0.2% pyridine vapor, were passed through the apparatus described in Example I, at 650° C. Of the total anhydride produced (47.85 grams), 83% was found in receivers 5 and 6 and 17% was found in receivers 7 and 8 as transformation product of the free ketene. Losses by decomposition were practically nil.

Example III.

The apparatus of Example I was modified to the extent that, instead of the Liebig cooler 4 and receiver 5, we used a vessel containing 100 grams of water cooled to 0° C., through which the hot split vapor products were passed. 105 grams of concentrated acetic acid produced, in one hour at 650° C. contact temperature, a total of 19.0 grams of anhydride, of which 11% was found in receivers 5 and 6, and 89% (as transformation product of the free ketene) was found in receivers 7 and 8.

Example IV

The operation was the same as in Example III except that 1% pyridine was added to the water as a preliminary measure. An aggregate quantity of 55.5 grams anhydride was produced, of which 31.6% were obtained in receivers 5 and 6, and 68.4% in receivers 7 and 8.

Example V

The operation was performed according to Example III except that the ketene discharged from receivers 5 and 6 was not allowed to react upon acetic acid, but was separated out by means of two low-cooled receivers arranged one behind the other like vessels 7 and 8 of Fig. 1 and each filled with 100 cubic centimeters of acetone to dissolve out the ketene. With an average of 105 grams of concentrated acetic acid per hour there were formed 20 molecules of anhydride plus ketene to every 100 molecules of acetic acid vapor, of which 4.4 molecules were found in receivers 5 and 6 as anhydride and 15.6 molecules in receivers 7 and 8 as pure ketene. There were no acetyl losses. It is also possible to condense the ketene without solvents if the temperature is maintained sufficiently low, as, for example, less than $-100°$.

Example VI

In this embodiment of the invention, which is illustrated in Fig. 2, we employed a vertical tube 10 composed of carbon, measuring 50 mm. in diameter and 800 mm. in height, stopped at the lower end by a carbon stopper. This vessel was mounted in an iron container 11 closely surrounding the carbon tube and heated electrically. From the flanged cover of container 11 a copper tube is led nearly to the bottom of the carbon tube. The carbon tube 10 was filled to a height of 100 mm. with an equimolecular mixture of sodium metaphosphate and lithium metaphosphate. Two cooled receivers 13 and 14 were attached to the iron container 11, receiver 13 being cooled with water and receiver 14 being cooled with brine at minus 20° C. The gases were then carried up through a dripping tower 15 which was filled with Raschig rings, and sprayed with concentrated acetic acid. The gases passed then through a water filled bottle 16 which retained traces of acetic acid; a vacuum pump 17 was attached to this bottle, whereby an absolute pressure of 30 to 60 mm. of mercury was maintained. The glacial acetic acid was passed through the melted catalyst heated to 730° C. with 0.3% pyridine vapor with a speed of about 600 grams per hour. Altogether 296 grams of anhydride were obtained from 330 grams of acetic acid which were exposed to the splitting up. Of the anhydride a quantity of 21% was found in the condensates of the two coolers 13 and 14, and 79% had formed from ketene in the dripping tower 15. The loss in acetyl amounted to 5.5% of the acetic acid used for the splitting processes.

We furthermore found that in carrying out this process the utilization of the gaseous catalysts described in the above mentioned Patent 1,946,707, particularly the use of phosphorus, phosphoric acid and volatile esters of phosphoric acid, offers considerable advantages as thereby disturbances through scattering or spraying which may otherwise occur at high gas velocities, are avoided.

As a variation of Example VI the process was performed in the same way except that the ketene escaping from receivers 13 and 14 was condensed in an empty receiver cooled with liquid nitrogen. The ketene thus obtained had a fusion point of about $-150°$ C. and a boiling point at atmospheric pressure of about $-48°$ C., and it was, therefore, very pure.

Instead of causing the reaction or other treatment of the ketene, to take place on the vacuum side as described in Example VI, it is also possible to drive the ketene to the pressure side by means of a vacuum pump, and on the pressure side to transform it in a similar way, as for example with the aid of acetic acid to make anhydride, as referred to earlier in the specification.

Example VII

The apparatus of Example VI was employed but the carbon tube 10 was empty. At an interior temperature of 700 to 740° C., 400 grams of acetic acid vapors were passed through the reaction tube in one hour. Four parts per mil. triethylester of phosphoric acid were added to the acetic acid vapor, as catalyst. At the end of the apparatus an absolute pressure of 35 mm. mercury was maintained. Of the total quantity of anhydride formed, which was 200 grams, 41% was found in the absorption tower as transformation product of ketene gas, and 59% was found in the cooler condensates.

Example VIII

The operation was carried out according to Example VII except that 3 parts pyridine per mil. were added to the acetic acid-triethylphosphate mixture and 300 grams of the mixture were supplied to the heater in an hour. Of the aggregate quantity of 200 grams of anhydride formed, 75% was obtained by absorption of the ketene gas in the dripping tower, and only 25% condensed out of the split vapor products by the cooler. The loss amounted to only 4% of the acetic acid employed for the splitting process.

*Example IX*

The operation was performed according to Example VII except that, instead of triethylphosphate, 0.5 part per mil. of phosphorus vapor was added to the acetic acid vapor. Of the total anhydride obtained, 27% was found in the ketene absorption.

*Example X*

The operation was performed according to Example VIII except that, instead of ethyl phosphate and pyridine, 1 part per mil. phosphoric acid and 1 part per mil. ammonia were added to the acetic acid vapor. Of the total anhydride obtained, 40% was the result of absorption of ketene.

It was further found that in this process the operation can be carried on with very good results substantially above 800° C. The ketene yield increases without increasing the decomposition to any substantial extent. The explanation of this may possibly be found in the short sojourn of the diluted vapors in the hot space and at the hot wall of the reaction chamber.

*Example XI*

An empty heated carbon tube, as in Example VI, without a catalyst charge, was used as the reaction vessel. Also the other disposition was the same as in Example VII. The interior of the tube was maintained at a maximum temperature of 830° C., 600 grams of acetic acid vapor containing 3 parts triethylphosphate per mil. were supplied to the carbon tube in an hour, while an absolute pressure of 35 mm. mercury was maintained at the end of the apparatus. An aggregate quantity of 475 grams of anhydride was formed. Of this, 17% was in the cooled condensates and 83% in the liquid flowing from the ketene absorption tower sprayed with acetic acid. The decomposition loss amounted to only about 3% of the acetic acid used for the splitting process.

*Example XII*

The operation was performed according to Example XI except that instead of the triethylphosphate 0.5 part phosphorus per mil. was supplied to the acetic acid vapor. At a maximum temperature of 870° C. in the interior of the reaction space, from 800 grams of acetic acid vapor which were supplied in one hour, 375 grams of anhydride were obtained, 74% of which was produced through absorption of the ketene and 26% of which was found in the condensation. The decomposition was small.

*Example XIII*

The operation was performed according to Example XI except that, in addition to the triethylphosphate, 3 parts pyridine vapor per mil. were added to the acetic acid vapor. At a maximum temperature of 890° C. in the interior of the carbon tube, and with 1160 grams of acetic acid introduced in one hour, there was formed altogether 1120 grams of anhydride. The proportion of anhydride from absorbed ketene amount to 89.5% of the total. Only 5% of the acetic acid employed was lost by decomposition.

*Example XIV*

The operation was carried out according to Example XIII except that ammonia was employed as the base addition instead of pyridine. The aggregate output in anhydride amounted to 88% of the weight of acetic acid used. The portion of the anhydride obtained from ketene amounted to 83%. The decomposition loss was small.

In carrying out our invention we may also employ various other steps or expedients which have proven advantageous for the production of anhydride, as, for example, preheating the acetic acid vapor, utilization of other or special catalysts, construction materials and apparatus. The term "vacuum" as used in the claims is intended to indicate a pressure substantially below atmospheric pressure, and such as is obtained through the use of a vacuum pump or other suitable pressure reducing arrangement.

The invention claimed is:

1. A catalytic process for producing ketene, which comprises heating acetic acid vapors under at least a partial vacuum at a temperature between 500° C. and 900° C. in the presence of a phosphorus-containing catalyst to form a mixture containing ketene, water, acetic acid and acetic anhydride, and separating water, acetic acid and acetic anhydride from the ketene by cooling said reaction mixture to a temperature substantially below 100° C. in the form of attenuated streams and in contact with metallic surfaces, whereby a large part of the ketene remains unchanged.

2. A catalytic process for producing ketene, which comprises heating acetic acid vapors under at least a partial vacuum at a temperature greater than 500° C., and below 900° C. in the presence of a phosphorus-containing catalyst to form a mixture containing ketene, water, acetic acid and acetic anhydride, and separating water, acetic acid and acetic anhydride from the ketene by cooling said mixture to a temperature below 100° C. in a cooler having an elongated cooling chamber of a capacity not substantially greater than one-tenth litre capacity at an average of 600 g. of acetic acid feed per hour, whereby a large part of the ketene remains unchanged.

3. A catalytic process for producing ketene, which comprises heating acetic acid vapors under at least a partial vacuum at a temperature between 500° C. and 900° C. in the presence of an acetic anhydride-forming catalyst to form a mixture containing ketene, water, acetic acid and acetic anhydride, and separating water, acetic acid and acetic anhydride from the ketene in the presence of a nitrogen-containing base by cooling said mixture to a temperature below 100° C. in a cooler having an elongated cooling chamber of a capacity not substantially greater than one-tenth litre capacity at an average of 600 g. of acetic acid feed per hour, whereby a large part of the ketene remains unchanged.

4. Process of producing ketene which comprises heating acetic acid vapor under less than atmospheric pressure at between 500°–900° C., separating water, acetic acid and acetic acid anhydride from the diluted ketene vapor by cooling in spaces which are not too large, and then compressing the ketene.

5. A catalytic process for producing ketene, which comprises subjecting acetic acid vapors to heating under a partial vacuum at a temperature between 400° C.—900° C. in the presence of an acetic anhydride-forming catalyst, to form materials containing ketene, water, acetic acid and acetic anhydride, and separating at least a part of the ketene by cooling said materials to temperatures below 100° C. in a cooler having an elongated cooling chamber of a capacity less than one-half litre per 600 grams of acetic acid feed per hour.

6. A catalytic process for the production of ketene, which comprises subjecting dilute acetic acid to heating under at least a partial vacuum at a temperature between 500° C. and 900° C. in the presence of an acetic anhydride-forming catalyst, to form a mixture containing ketene, water, acetic acid and acetic anhydride, and separating water, acetic acid and acetic anhydride from ketene before the ketene has had time to recombine into acetic acid and acetic anhydride.

7. A process for the production of ketene, which comprises subjecting dilute acetic acid of a strength between 60% to 90% to heating under reduced pressure at a temperature between 500° C. and 900° C. in the presence of a volatile phosphorus-containing catalyst, to form a reaction mixture containing ketene, water, acetic acid and acetic anhydride and separating ketene by procedure including cooling the reaction mixture in the form of thin, elongated streams.

8. A catalytic process for producing ketene, which comprises subjecting acetic acid vapors to heating under partial vacuum at a temperature between 500° C. and 900° C. in the presence of a phosphorus-containing acetic anhydride-forming catalyst to form a mixture containing ketene, water, acetic acid and acetic anhydride, separating water, acetic acid and acetic anhydride from ketene by cooling said reaction mixture to a temperature substantially below 100° C. in the form of attenuated streams and in contact with metallic surfaces, and then condensing the ketene by further cooling to low temperatures substantially below 0° C.

9. A catalytic process for the production of ketene, which comprises subjecting dilute acetic acid to heating under at least a partial vacuum at a temperature between 500° C. and 900° C. in the presence of an acetic anhydride-forming catalyst to form a mixture containing ketene, water, acetic acid and acetic anhydride, separating water, acetic acid and acetic anhydride from ketene by a plurality of cooling steps including cooling the mixture in the form of attenuated streams and in contact with metallic surfaces, and then dissolving ketene in a solvent.

10. A process of producing ketene which comprises heating acetic acid vapor under less than atmospheric pressure at between 500° C.—900° C. to form ketene as a primary dissociation product, separating water, acetic acid and acetic acid anhydride from the diluted ketene vapor by cooling in spaces which are not too large and in the presence of small quantities of nitrogen-containing bases, and then compressing the ketene.

JOHANN SIXT.
MARTIN MUGDAN.